United States Patent Office 3,758,446
Patented Sept. 11, 1973

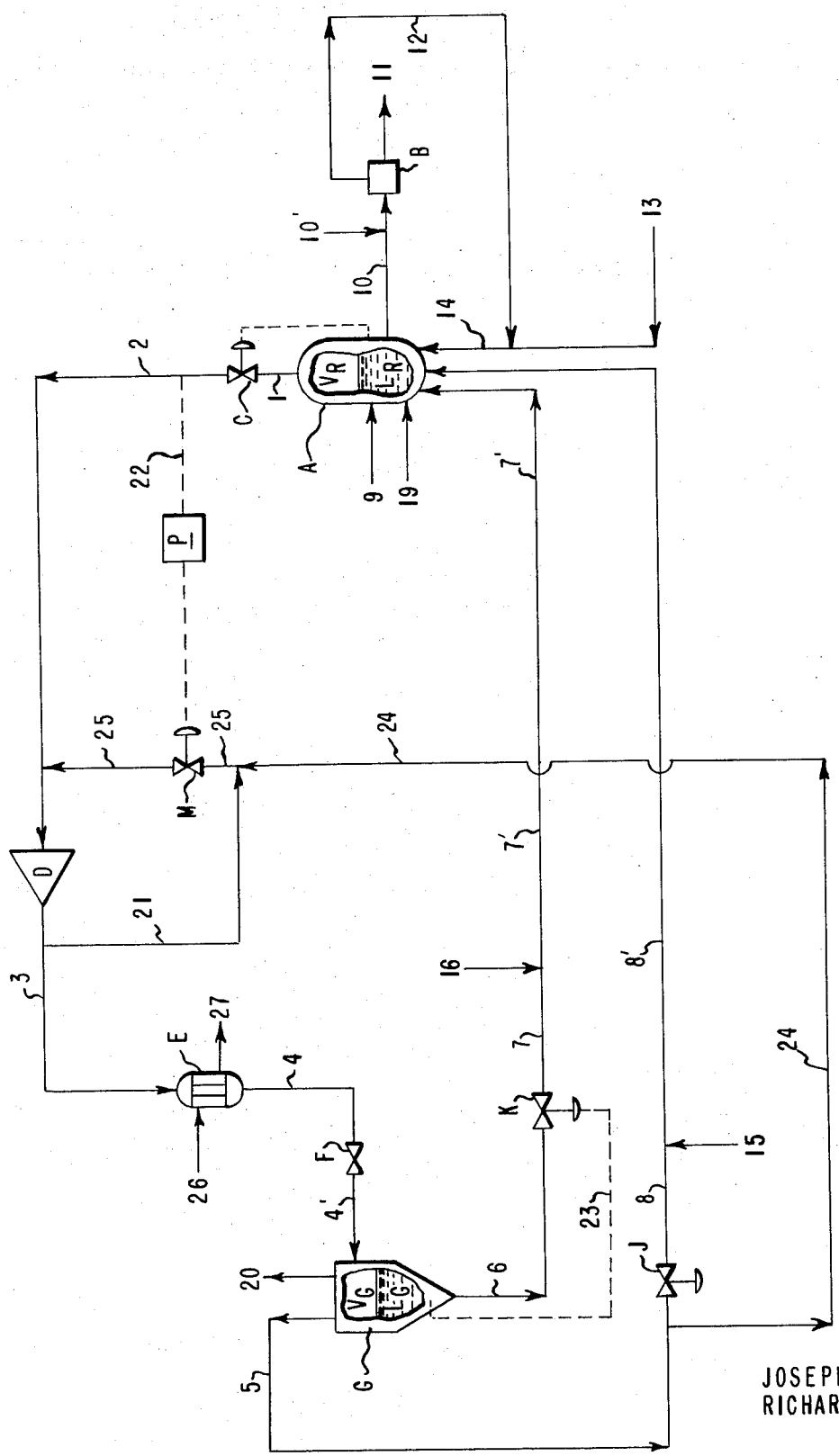

3,758,446
PROCESS FOR CONTROLLING MOLECULAR
WEIGHT OF ALPHA-OLEFIN POLYMERS
Joseph F. Coughlin, Wilmington, and Richard J. Ruszkay, Newark, Del., assignors to E. I. du Pont de Nemours and Company, Wilmington, Del.
Filed June 10, 1971, Ser. No. 151,649
Int. Cl. C08f 15/40, 15/04, 3/02
U.S. Cl. 260—80.78
11 Claims

ABSTRACT OF THE DISCLOSURE

In a continuous process for polymerizing at least one gaseous $C_2$–$C_7$ alpha-olefin with a coordination catalyst in the presence of molecular hydrogen as a molecular weight regulator in a reactor containing a liquid and a gaseous phase, the improvement consisting essentially of compressing and partially condensing reactor off-gas, passing the resulting condensate and uncondensed gas to a reservoir from which both materials are recycled to the reactor, said reservoir containing sufficient condensate and uncondensed gas such that molecular hydrogen is present in the reservoir in an amount of at least 10% of the weight of molecular hydrogen in the reactor, and regulating polymer molecular weight by controlling the fraction of off-gas condensed.

BACKGROUND OF THE INVENTION

This invention relates to the polymerization of alpha-olefins alone or with other alpha-olefins and, more particularly, to an improved method for efficiently controlling the molecular weight of such polymers.

The use of molecular hydrogen (hereinafter simply "hydrogen") to control the molecular weight of alpha-olefin polymers is well known. However, in order to control the molecular weight in this manner in a continuous process, it is necessary to have an effective means for controlling hydrogen concentration in the liquid phase of the reactor. Of course, the hydrogen concentration in the liquid phase is proportional to hydrogen partial pressure in the vapor phase of the reactor under equilibrium conditions. One means of controlling polymer molecular weight when monomers such as ethylene and propylene are polymerized is to maintain constant the hydrogen concentration in the liquid phase while adjusting the monomer concentrations in the liquid and vapor phases in the reactor. This approach is not completely satisfactory because changing molecular weight by adjusting monomer concentrations takes longer than usually desirable. Furthermore, lowering monomer concentrations reduces catalyst efficiency which could result in a serious cost disadvantage when using coordination catalyst systems containing vanadium. Also, excess monomers added to the process to raise molecular weight may have to be purged from the system subsequently to reduce molecular weight.

Another method for controlling the molecular weight of ethylene copolymers involves regulating the flow of fresh hydrogen to the reactor. This method is also slow, and tends to be wasteful of hydrogen because excess hydrogen must be sometimes removed in the gas recycle loop to increase molecular weight.

There has been a need for an economical and more effective method for controlling the molecular weight of alpha-olefin polymers using hydrogen as the molecular weight regulator in a continuous polymerization process, a method which can provide rapid adjustments in molecular weight when needed.

SUMMARY OF THE INVENTION

This invention provides, in a continuous process for preparing polymers of at least one gaseous $C_2$–$C_7$ alpha-olefin with a coordination catalyst in the presence of hydrogen in a reactor containing a liquid and a vapor phase, the improvement of compressing and partially condensing reactor off-gas, passing the resulting condensate and uncondensed gas to a reservoir from which both materials are recycled to the reactor, said reservoir containing sufficient condensate and uncondensed gas such that molecular hydrogen is present in the reservoir in an amount of at least 10% of the weight of molecular hydrogen in the reactor, and regulating polymer molecular weight by controlling the fraction of off-gas condensed.

The improved process of this invention provides a means for rapidly adjusting the molecular weight of $C_2$–$C_7$ alpha-olefin polymers by regulating hydrogen concentration in the reactor. The improved process of this invention accomplishes the rapid molecular weight control without wasting valuable reactants such as monomers and hydrogen.

DESCRIPTION OF THE INVENTION

This invention is applicable to polymerization processes conducted in a reactor with an off-gas recycle loop. When the polymerization is conducted in the presence of hydrogen to regulate molecular weight of the polymer produced, part of the recycled gas is hydrogen. Since hydrogen is not readily soluble in the monomers or any solvent which might be used as a reaction medium, the concentration of hydrogen in the vapor phase in the reactor is greater than the concentration of hydrogen in the liquid phase. Also, the total weight of hydrogen (hydrogen inventory) in the vapor phase in the reactor is greater than the hydrogen inventory in the liquid phase. Similarly, the hydrogen concentration in the off-gas recycle loop is greater than the hydrogen concentration in either vapor or liquid phases in the reactor and the hydrogen inventory in the recycle loop is usually at least 10% of the hydrogen inventory in the reactor.

This invention is applicable to the homopolymerization of a $C_2$–$C_7$ alpha-olefin but is particularly useful for copolymerization of ethylene with at least one other $C_2$–$C_7$ alpha-olefin. Propylene and 1-butene are preferred alpha-olefins. Generally, the polymers will be produced by solution polymerization process to form hydrocarbon soluble copolymers of ethylene containing about 20–60% propylene. Preferably the polymers contain about 25–50% propylene by weight. However, the proportion of propylene or other alpha-monoolefin in the copolymer is not critical to the successful operation of this invention.

By the term "hydrocarbon soluble copolymer" is meant that a copolymer in the reactor is soluble at the polymerization temperature, preferably —20° C. to about 80° C., in a hydrocarbon useful as a polymerization solvent. A slurry polymerization process (at least some polymer being out of solution) can also be employed in accordance with this invention. A monomer can be used as the reaction medium.

A minor amount of one or more other monomers can also be present in the polymer. For example, in a preferred embodiment of this invention a $C_6$–$C_{22}$ non-conjugated hydrocarbon diene having only one polymerizable double bond is copolymerized with ethylene and propylene. Representative dienes are 1,4-hexadiene, dicyclopentadiene, 5-methylene-2-norbornene, 5-ethylidene-2-norbornene and 1,5-cyclooctadiene. The general preparation of such polymers is well known.

When a non-conjugated hydrocarbon diene is present during polymerization, the polymer produced will typically contain about 1 percent to 20 percent by weight of the diene, preferably about 2 percent to 10 percent by weight. However, the proportion of the diene in the soluble copolymer is not critical to the successful operation of this invention.

The invention will usually be most valuable for a polymerization conducted in a hydrocarbon liquid although nonhydrocarbons such as methylene chloride and perchloroethylene can be used. It is preferred that the polymerization be conducted in a $C_5$–$C_8$ hydrocarbon liquid such as pentane, hexane, cyclohexane, benzene or heptane. Compatible mixtures of solvents can be employed by those skilled in the art when desired.

The polymerization process is conducted using a conventional coordination catalyst. Preferred catalyst systems consist essentially of vanadium tris(acetylacetonate) [V(AA)] and diisobutyl aluminum chloride (DIBAC) as well as the combination of vanadium tetrachloride ($VCl_4$) and DIBAC. Also preferred is the system using vanadium oxytrichloride, ethyl aluminum ethoxide, DIBAC, diethyl aluminum chloride, and benzotrichloride; also the system using vanadium oxytrichloride and DIBAC. In using such catalysts, suitable aluminum to vanadium (Al/V) mole ratios and amounts of catalyst employed per liter of total solution will depend on the specific compounds and conditions employed. These are well known. Usually Al/V mole ratios will fall within the range of about 2:1 to about 20:1, and the amount of catalyst expressed as vanadium content frequently ranges from about 0.00001 to 0.002 mole per liter.

The process of this invention can be more readily understood by reference to the drawing. In one embodiment lines 21, 24 and 25 are eliminated along with M, P and connection 22. Reactor A, used to continuously copolymerize ethylene, propylene and 1,4-hexadiene in hexane, has a vapor or gas phase $V_R$ above a liquid phase $L_R$. A coordination catalyst is formed by premixing vanadium oxytrichloride with diisobutyl aluminum chloride, and the catalyst is introduced into reactor A through conduit 9. A liquid stream 10 is continuously removed from the liquid phase of reactor A and copolymer is isolated from stream 10 at B via line 11 by conventional techniques. Liquid stream 12 from the copolymer isolation process is combined with fresh 1,4-hexadiene monomer from stream 13 to form stream 14 which is fed to reactor A.

The overhead vapor phase stream 1 from reactor A, containing principally unpolymerized ethylene and propylene, plus hexane and lesser amounts of other volatile materials, is passed through valve C to form stream 2 which is fed to compressor D where it is compressed. Valve C serves to regulate the flow rate of reactor off-gas 1 in response to a need for reactor cooling. It is preferable to use an automatic control valve responsive to temperature in reactor A. For example, as the temperature in reactor A increases, more of the reactants in the liquid phase $L_R$ evaporated and fill the vapor space $V_R$. The additional vapor is removed from the reactor by opening valve C and permitting the off-gas to be condensed and recycled to the reactor to provide additional evaporative cooling. Conversely, if the temperature in the reactor drops less liquid in $L_R$ will be evaporated and valve C will partially close reducing the amount of off-gas which is condensed and subsequently recycled to the reactor.

Compressed gas stream 3 is sent to a condenser E wherein the temperature of the stream is lowered and a liquid/gas stream 4 is formed. Cooling fluid enters E through stream 26 and exits via stream 27. The compressor operates at a pressure significantly higher than the reactor pressure, therefore, stream 4 is passed through a flash valve F to reduce the pressure of the stream and form a liquid/gas stream 4'. Stream 4' is passed into purge pot G where liquid $L_G$ and uncondensed gas $V_G$ from stream 4' separate. At least part of the uncondensed gas $V_G$ in stream 5 is recycled to reactor A via valve J and stream 8. Stream 8 can be combined with ethylene make-up monomer from stream 15 to form stream 8' which is recycled to reactor A. There is a significant advantage in recycling all or part of the gas in stream 5 in this manner. The temperature of the gas at 5 is lower than reactor temperature, thus recycling of this gas to the reactor, where it is warmed, provides sensible cooling for removing reactor heat generated by the exothermic polymerization.

A vent line 20 can optionally be used on purge pot G to permit removal of volatile impurities in the system. For example, methane, ethane, and nitrogen are generally found in the off-gas stream 1 and are preferably removed from the system at 20. Nitrogen enters the system as solute in the polymerization solvent. For reasons of process safety, the solvent is generally stored prior to use under a nitrogen gas blanket in a separate vessel not shown.

The condensate in stream 6 from $L_G$ in purge pot G containing mainly ethylene and propylene is passed through liquid level control K and recycled to reactor A via stream 7. K is typically a valve used to maintain the liquid level in the purge pot. Too high a liquid level in the purge pot will result in an overflow of the liquid in the gas stream 5. Discharge of all the liquid out of the purge pot will permit the passage of recycle gas through the recycle liquid stream. Both of these conditions can be avoided by automatic or manual regulation of level control K. Stream 1 can be combined with propylene makeup monomer from stream 16 to form stream 7' which is recycled to reactor A.

Hydrogen gas is typically added to reactor A as shown at 19 to regulate the Mooney viscosity of the copolymer. The point of introduction of fresh hydrogen into the system is not critical. For example, fresh hydrogen can be added to stream 7, stream 8, the vapor phase in the reactor, etc. The hydrogen to be used is of a quality well known in the art. It is preferable that the hydrogen gas be substantially free of polar impurities such as water vapor, carbon monoxide, and carbon dioxide.

It has been found that the molecular weight of copolymer produced in reactor A can be regulated by regulating the fraction of reactor off-gas condensed and recycled to the reactor. The fraction of reactor off-gas condensed can be conveniently regulated by a device such as valve J in the gas recycle line 5. Closing valve J increases the presure on purge pot G resulting in the condensation of more vapor from stream 4'. This larger amount of condensate in purge pot G is recycled to reactor A via streams 6 and 7 and provides additional evaporative cooling to the reactor. Reactor temperature is controlled automatically by valve C. Conversely, a smaller fraction of reactor off-gas is condensed by opening valve J thus decreasing the pressure of purge pot G and permitting more of the gas in stream 4' to be recycled to the reactor via streams 5 and 8.

When the fraction of reactor off-gas is only partially condensed in condenser E, fractionation of hydrogen takes place between the vapor and liquid in purge pot G. This fractionation has an enriching effect, that is, the gas in purge pot G becomes richer in hydrogen than the liquid in purge pot G. For example, when valve J is closed more vapor from stream 4' condenses in purge pot G due to the increase in pressure. Since the hydrogen is not readily soluble in the liquid phase, the hydrogen concentration in the gas phase in purge pot G will increase as will the hydrogen inventory in the gas phase in purge pot G. Thus when less gas is recycled to the ractor A via stream 5, less hydrogen will be fed to the reactor, resulting in a lower concentration in the reactor.

Conversely when flow control valve J is opened less vapor from stream 4' will condense in purge pot G and more vapor will be recycled via stream 5 to the reactor. Since the hydrogen inventory in the gas phase in purge pot G is greater than the hydrogen inventory in the liquid phase in purge pot G, recycling a large amount of gas via stream 5 will result in the introduction of more hydrogen into reactor A, resulting in a higher concentration in the reactor.

It has surprisingly been found that regulating the fraction of reactor off-gas condensed and eventually recycled to the reactor can be used to accomplish either one of two objectives. First, it can be used to maintain the Mooney viscosity of the copolymer in the reactor within desirable limits. For example, it may be desirable to maintain the Mooney viscosity of the copolymer practically constant. Adjustment of the fraction condensed can also be used to quickly change the Mooney viscosity of copolymer produced in the reactor. For example, if a copolymer having a Mooney viscosity of 80 is being produced, and it is desired to change to production of a polymer having a Mooney viscosity of 50, adjustment, of the fraction of reactor off-gas condensed and recycled to the reactor will result in adjustment of the molecular weight of polymer in the reactor. Mooney viscosity is a convenient measure of polymer molecular weight.

Thus, in accordance with this invention the molecular weight of a copolymer produced by polymerization of a $C_2$-$C_7$ alpha-olefin can be maintained practically constant by maintaining practically constant the fraction of reactor off-gas condensed and recycled to the reactor. On the other hand, when it is desired to change the molecular weight of copolymer produced, the fraction of reactor off-gas condensed can be easily changed to effect a rapid change in copolymer molecular weight.

The amount of reactor off-gas to be condensed can be readily determined. For example, if it is desired to produce a polymer having a Mooney viscosity of 75, one method is to set up the reactor and operate the process with varying fractions of off-gas condensed until the proper polymer is obtained and the system is operating at steady state. Once the proper polymer is obtained, then the fraction of reactor off-gas condensed and recycled to the reactor is maintained constant. In these circumstances the numerical value of the fraction is not technically critical and will vary depending on the type of polymer produced and other process conditions which are known to the art skilled. However, it is important to maintain the fraction constant.

As is readily apparent, the process economics are improved by condensing as large a fraction of off-gas as possible, consistent with maintaining control of molecular weight. Therefore, it is usually preferred to adjust the overall hydrogen inventory so that the mean value of the fraction of off-gas condensed is about 60-90% at the desired molecular weight.

The fraction of reactor off-gas condensed can also be expressed as the ratio of two of the three streams: off-gas stream 1, gas recycle stream 8, and liquid recycle stream 7. If there is a constant fraction of reactor off-gas condensed, any two of these three streams are in a constant molar ratio. It is most convenient to maintain the molar ratio of stream 8 to stream 1 constant because of the ease of ratioing gas streams.

Suppose the process is operating properly and a polymer having a Mooney viscosity of 75 is being obtained by maintaining the fraction of reactor off-gas condensed constant. It is desired to produce a polymer having a Mooney viscosity of 50. One means of changing polymer types in this manner is to measure the hydrogen concentration in the reactor, for example, by vapor phase chromatography (VPC). VPC measurements can be made continuously or by a batch sampling technique. As previously explained, the level of hydrogen in the reactor required to produce a polymer having a Mooney viscosity of 50 will be known to the art skilled. Thus, knowing that to produce a polymer of lower molecular weight, a higher hydrogen level is required in the reactor, it is only necessary to correct the fraction of reactor off-gas condensed until the desired hydrogen concentration is obtained in the reactor. When the proper hydrogen concentration is obtained, the Mooney viscosity of the polymer can be measured and minor corrections in the fraction made if required. The fraction can be maintained constant again to produce uniform polymer having a Mooney viscosity of 50. As previously noted, there is no single numerical value for the fraction condensed applicable to all polymer types, or even the same polymer under different process conditions (e.g., temperature and pressure). The important aspect of this invention is that there is provided a fast and economical method for regulating a process for produce polymer of uniform molecular weight. The adjustments in hydrogen concentration in the reactor made by regulating the fraction of reactor off-gas condensed as previously described can be made in a matter of minutes. However, methods employed heretofore required hours to make the necessary adjustments. Without this invention, the additional time is required because hydrogen adjustments are made by changing the feed rate of fresh hydrogen, and inventories in both reactor and recycle loops must change in the same direction. Because of the large hydrogen inventory in the system relative to the fresh hydrogen feed rate usually available without excessive cost, such inventory changes required unduly long periods.

In operating the process of this invention various automatic instrumentation control schemes can be employed as the art skilled will recognize. Regulation of the amount of reactor off-gas condensed can be accomplished by a second embodiment. In this embodiment line 24 in the drawing is omitted. Liquid level control K can be an automatic control device, operation of which is dependent upon the liquid level in purge pot G. As more gas in the recycle loop is condensed, control K is opened to allow more liquid to return to reactor A and maintain liquid level in purge pot G. Control J in the gas recycle stream can be a constant flow device, such as a valve, orifice and controller. If compressor D pumps a constant volume of gas, the amount of gas passed to the condenser E can be regulated by by-pass line 21 around compressor D by recycling a portion of the compressed gas in stream 3 to the compressor suction maintained at constant pressure. The amount of gas by-passed around the compressor via line 21 can be regulated by means of a pressure dependent control valve M. As the temperature in reactor A is increased, valve C opens to permit the escape of more gas from the reactor. The increased amount of off-gas causes an increase in pressure in stream 2. As the pressure in stream 2 rises, valve M is throttled down (closed or partially closed) causing a larger volume of gas in stream 3 to pass around the recycle loop. With constant gas flow through control valve J, a larger volume of gas is condensed and recycled to reactor A to provide additional liquid for evaporative cooling to lower the temperature in reactor A.

Another automatic control scheme is illustrated by the drawing as a third embodiment similar to the second except that the compressor by-pass line 21 is eliminated, and gas in stream 5 not recycled to reactor A via stream 8 is recycled to the suction of compressor D via stream 24, through controller M and stream 25. Controller M functions in the same manner as described in relation to stream 2.

It is clear from the drawing that all of the uncondensed reactor off-gas is eventually either recycled to the reactor partly as liquid and partly as vapor, or is vented from the system via line 20 on purge pot G.

This invention enables the preparation of alpha-olefin copolymers and terpolymers by an improved process which affords more precise and rapid control or change of molecular weight. Polymer of excellent quality can be produced with good catalyst efficiency. Use of the polymers as elastomers is well known in the art. The operation of the process of this invention and the advantages thereof will be further apparent from the following examples in which all parts, proportions, and percentages are by weight unless otherwise indicated.

EXAMPLE 1

In the following example, all feed quantities are based on a production rate of one kilogram of copolymer product per hour. The drawing illustrates application of the present invention to an ethylene copolymerization process.

An evaporatively cooled reactor A for the continuous solution copolymerization of ethylene, propylene, and 1,4-hexadiene in hexane is operated at 42° C., 6.94 kg./cm.$^2$ (absolute) pressure and a residence time of about 30 minutes. Reactor A has a vapor phase $V_R$ above a liquid phase $L_R$ (in which tripolymer forms). In the liquid phase, the mole ratio of propylene to ethylene is about 11.1, the mole fraction of propylene is about 0.221, and the weight of hydrogen is 0.0106 gram. In vapor phase $V_R$ the hydrogen partial pressure is 0.06 kg./cm.$^2$ and the hydrogen inventory is 0.1160 gram.

A coordination catalyst, formed by premixing $VOCl_3$ (3.1 grams/hr.) with diisobutyl aluminum chloride (9.8 grams/hr.) is continuously introduced into reactor A by a conduit 9.

The reactor liquid phase is continuously cooled by evaporation of volatiles, chiefly unreacted propylene, some ethylene, and a very small proportion of hydrogen and inerts (such as nitrogen and methane and solvent). The reactor overhead vapor phase exits via conduit 1 containing valve C which maintains constant reactor temperature. The flow rate in stream 1 is designated hereinafter as $F_1$ and is initially 132.50 g.-mol/hr. The vapor enters the suction end of compressor D, is compressed to a pressure of 25.3 kg./cm.$^2$ (absolute), exits along conduit 3 to condenser E operated at 34.5° C. where part of the monomer gas is liquified. The resulting two phases pass via conduit 4 to a 2-phase purge separator G operated at about 25.3 kg./cm.$^2$ (abs.) and 34.5° C.

Hydrogen (0.0140 gram-mol/hr.) and some inerts are steadily bled from G via stream 20. In purge separator G, the inventory of hydrogen is 0.4180 gram in vapor phase $V_G$ and 0.0300 gram in liquid phase $L_G$ which exits from the bottom of G and is recycled to reactor A by way of conduit 7. The gas recycled from vapor phase $V_G$ exits along conduit 5 and passes through valve J at the rate of 1.23 kg./cm.$^2$, equivalent to 30.20 g.-mol/hr. The flow rate of stream 5 is designated $F_2$ hereinafter. The vapor continues along stream 8 to the reactor A. Make-up hydrogen (0.0140 grams/hr.) flows to A via conduit 19.

The ratio of recycle gas flow $F_2$ to reactor off-gas flow $F_1 = 30.20/132.50 = 0.226$.

From reactor A liquid effluent (169 gram-mols/hr. on a polymer-free basis), containing 5.4 weight percent polymer, passes continuously along conduit 10. Steam, flows along conduit 10' joining 10 and deactivates the catalyst, thereby stopping the polymerization. The combined streams flow to monomer flasher B operated at about 100° C. and 1.0 kg./cm.$^2$. The residual liquid phase exits B along conduit 11 to polymer isolation units (not shown). Liquid recovered during polymer isolation, largely solvent and 1,4-hexadiene, is returned to reactor A via conduit 12. Make-up propylene (410 grams/hr.) and make-up 1,4-hexadiene (66 grams/hr.) are added to the system via respective conduits 16 and 13. Make up ethylene (530 grams/hr.) is added via conduit 15.

Ethylene and propylene monomer concentrations in liquid phase L in reactor A are determined by VPC. The 1,4-hexadiene monomer concentration in liquid phase L in reactor A is determined by VPC.

Typically, this process yields a rubber-like tripolymer having the following monomer unit composition: ethylene, about 52.4 wt. percent; propylene, 41 wt. percent; 1,4-hexadiene, about 6.6 wt. percent; the Mooney viscosity (ML-1+4/121° C.) is about 45.

As mentioned earlier, the reactor off-gas rate is 132.5 gram-mols/hr. Suddenly, trace catalyst poisoning occurs which decreases the polymer production rate. As a consequence, the reactor off-gas flow rate is lowered to 122 gram-mols/hr.

If the recycle gas flow, $F_2$, remains at 1.23 kg./hr., the pressure in purge separator G will adjust itself to a lower equilibrium value (25 kg./cm.$^2$ absolute). This change will cause a decrease in the fraction of the reactor off-gas flow which is condensed. More gaseous ethylene and propylene will be present therein, forcing a hydrogen inventory shift enriching reactor A, and undesirable lowering the molecular weight of the polymer being made there will result. In purge separator G, hydrogen in the vapor phase $V_G$ and liquid phase $L_G$ change almost immediately to 0.4070 gram and 0.0296 gram from their respective previous values of 0.4180 gram and 0.0300 gram. In reactor A, hydrogen in vapor phase V and liquid phase L now change to 0.1226 gram and 0.011 gram, respectively, from their previous values of 0.1160 gram and 0.0106 gram. In the system connecting reactor A and purge separator G there is now 0.0790 gram of hydrogen; before there had been 0.0760 gram. This is $V_{A-G}$ in Table 1.

TABLE 1.—EXAMPLE 1

|  | $L_R$ | | $V_R$ | | $V_{A-G}$* and $F_1$** | | $V_G$ | |
| --- | --- | --- | --- | --- | --- | --- | --- | --- |
|  | I | II | I | II | I | II | I | II |
| Hydrogen inventory, g | 0.0106 | 0.0110 | 0.1160 | 0.1226 | *0.0760 | *0.0790 | 0.4180 | 0.4070 |
| Flow rate, g. mol/hr | | | | | **132.50 | **122.00 | | |
| Temperature, ° C | 42 | 42 | 42 | 42 | | | 34.5 | 34.5 |
| Pressure, kg./cm.$^2$ (abs.) gas | 6.940 | 6.940 | 6.940 | 6.940 | | | 25.3 | 25 |
| P/E, molar ratio | 11.12 | 11.12 | 3.1765 | | | | | |

|  | $L_G$ | | 20 ($H_2$ only) | | $F_2$ | | 19 | |
| --- | --- | --- | --- | --- | --- | --- | --- | --- |
|  | I | II | I | II | I | II | I | II |
| Hydrogen inventory, g | 0.0300 | 0.0296 | | | | | | |
| Flow rate, g. mol/hr | | | 0.0140 | 0.0140 | 30.20 | 30.20 | 0.0140 | 0.0140 |
| Temperature, ° C | 34.5 | 34.5 | 34.5 | 34.5 | | | | |
| Pressure, kg./cm.$^2$ (abs.) gas | 25.3 | 25 | 25.3 | 25 | | | | |
| P/E, molar ratio | | | | | | | | |

Corrected $F_2 = 27.60$ g., mols/hr. restores original reactor $H_2$ inventory.

|  | Initially | After catalyst poisoning | After correction |
| --- | --- | --- | --- |
| $F_2/F_1$ | 30.20/132.5=0.226 | 30.20/122.00=0.251 | 27.60/122.00=0.226 |

NOTES:
1. Columns marked "I" are initial values for system as described in Example 1.
2. Columns marked "II" are values after production rate is lowered caused by catalyst poisoning but before $F_2$ is corrected.

To restore the original hydrogen content in reactor A and avoid the undesirable conditions caused by the slowdown in production, recycle gas flow is decreased so that the ratio K of the recycle gas flow rate to the reactor off-gas flow rate is maintained constant.

$K = 0.266 = F_2/122$
$F_2 = 27.6$ gram-mols/hr.

When this is done, the pressure in purge separator G rises again, hydrogen is shifted back to purge separator G leaving 0.0106 gram of hydrogen in reactor liquid phase L as before. It will take only about 3-4 minutes, which is the residence time of each mole of gas per pass around the cooling loop.

EXAMPLE 2

This example describes how a typical deliberate change in reactor hydrogen concentration is made in order to change the molecular weight of the polymer. The initial system is the one described in Example 1 prior to the onset of trace catalyst poisoning; thus, for example, $F_1$ and $F_2$ are 132.50 g.-mols/hr. and 30.20 g.-mols/hr., respectively.

It is desired to increase the molecular weight of the tripolymer product while maintaining the monomer unit composition unchanged. To accomplish this objective, the hydrogen inventory in the liquid phase in the reactor is to be decreased by 0.0015 g. from its initial value of 0.0106 gram. In accordance with this invention, this change is rapidly accomplished (in 4-5 minutes) by condensing a higher proportion of the reactor off-gas than before. This action is initiated by throttling back (partially closing) valve J, thereby reducing the recycle gas flow $F_2$ from its initial value of 30.20 g.-mols/hr. to 22.62 g.-mols/hr. and causing the pressure on the purge separator G to increase from its initial value of 25.20 kg./cm.² to 26.01 kg./cm.² (absolute). More cooling is applied to the reactor as the flow of condensate to the reactor increases from its initial value of 101.57 g.-mols/hr. to 102.36 g.-mols/hr.; in compensation, valve C simultaneously reduces the reactor off-gas flow rate $F_1$ to 125.42 g.-mols/hr. from its initial value of 132.50 g.-mols/hr. to maintain constant reactor temperature at constant polymerization rate.

The practically simultaneous changes described above cause the value of $F_2$:$F_1$ to decrease to 0.180; the percent condensation is now about 82% (it was about 78%). In consequence, some of the hydrogen in the reactor shifts to the purge separator G, increasing the inventory in the gas phase to 0.4360 gram from the initial value of 0.4180 gram; in the purge separator liquid phase the hydrogen inventory rises to 0.0319 gram (it was initially 0.0300 gram); in the reactor liquid L and vapor phase V, the hydrogen inventory falls to 0.0091 gram and 0.0978 gram, respectively; in the lines between reactor A and purge separator G the hydrogen inventory changes slightly from the initial value of 0.0760 gram to 0.0759 gram.

The hydrogen feed rate is increased to 0.0148 gram-mol/hr. to compensate for the increased hydrogen purge loss due to the changed vapor-liquid equilibrium split in the purge separator G.

Table 2 lists the pertinent flow rates and the hydrogen inventory in the system.

As described above, the desired change in reactor liquid phase hydrogen inventory can typically be done in 4-5 minutes by following the process of this invention. If a conventional alternative is tried, for example, by decreasing the hydrogen inventory by shutting off the fresh hydrogen supply while continuing to purge hydrogen at the rate of 0.014 g.-mol (i.e., 0.028 g.)/hr., much less satisfactory results occur. The initial total hydrogen inventory is 0.6506 gram; 15.7%

$[100(0.1160 - 0.0978)/0.116 = 15.7\%]$ of this value would have to be purged, corresponding to 0.102 gram. About 4 hours would be required; the large amount of off-specification polymer production and the wasteage of hydrogen would be unacceptable.

TABLE 2.—EXAMPLE 2

| | $L_R$ | | $V_R$ | | $V_{A-G}$* and $F_1$** | | $V_G$ | | $L_G$ | |
|---|---|---|---|---|---|---|---|---|---|---|
| | I | II | I | II | I | II | I | II | I | II |
| Hydrogen inventory, g | 0.0106 | 0.0091 | 0.1160 | 0.0978 | *0.0760 | *0.0759 | 0.4180 | 0.4360 | 0.0300 | 0.0319 |
| Flow rate, g. mol/hr | | | | | **132.50 | **125.42 | | | | |
| Temperature, °C | 42 | 42 | 42 | 42 | | | 34.5 | 34.5 | 34.5 | 34.5 |
| Pressure, kg./cm.² (abs.) | 6.940 | 6.9255 | 6.940 | 6.9255 | | | 25.2 | 26.008 | 25.2 | 26.008 |
| P/E, molar ratio | 11.12 | 11.12 | 3.1765 | 3.1765 | | | | | | |

| | 20 (H₂ only) | | $F_2$ | | 19 | | 6 | |
|---|---|---|---|---|---|---|---|---|
| | I | II | I | II | I | II | I | II |
| Hydrogen inventory, g | | | | | | | | |
| Flow rate, g. mol/hr | 0.0140 | 0.0148 | 30.20 | 22.62 | 0.0140 | 0.0148 | 101.57 | 102.36 |
| Temperature, °C | 34.5 | 34.5 | | | | | | |
| Pressure, kg./cm.² (abs.) | | | | | | | | |
| P/E, molar ratio | | | | | | | | |

| | Initially | After correction |
|---|---|---|
| $F_2/F_1$ | 30.20/132.50 = 0.228 | 22.62/125.42 = 0.1804 |
| Percent condensed | 78 | 82 |

NOTES:
1. Columns marked "I" are initial values for system described in Example 2.
2. Columns marked "II" are values after the fraction of off-gas condensed is changed.
3. Percent condensed = rate stream 6/rate stream 6 + $F_2$ × 100.

We claim:

1. In a continuous process for preparing a polymer of at least one gaseous $C_2$–$C_7$ alpha-olefin in the presence of a coordination catalyst and hydrogen as a molecular weight regulator in a reactor containing a liquid and a vapor phase, the improvement consisting essentially of a compressing and partially condensing reactor off-gas and recycling the resulting condensate and uncondensed gas to the reactor while temporarily holding up the condensate and uncondensed gas during recycle in a reservoir in an amount containing at least 10 percent of the hydrogen in the reactor, monitoring recycle uncondensed gas and reactor off-gas flow rates, and regulating the polymer molecular weight by regulating the ratio of recycle uncondensed gas to reactor off-gas.

2. The process of claim 1 wherein the ratio of recycle uncondensed gas to reactor off-gas is regulated by adjusting pressure in the reservoir and thereby controlling the fraction of reactor off-gas which is condensed.

3. The process of claim 2 wherein ethylene is copolymerized with propylene.

4. The process of claim 3 wherein ethylene, propylene, and a nonconjugated $C_6$–$C_{22}$ hydrocarbon diene are copolymerized in solution.

5. The process of claim 4 wherein the nonconjugated diene is 1,4-hexadiene.

6. The process of claim 5 wherein the solvent is hexane.

7. The process of claim 4 wherein the nonconjugated diene is at least one of 5-methylene-2-norbornene, 5-ethylidene-2-norbornene, dicyclopentadiene, and 1,5-cyclooctadiene.

8. The process of claim 2 wherein the fraction of reactor off-gas which is condensed is controlled by a valve in the uncondensed gas recycle stream.

9. The process of claim 2 wherein regulation is to maintain polymer production of essentially constant molecular weight.

10. The process of claim 2 wherein regulation is to provide a change in polymer molecular weight by increasing pressure in said reservoir to prepare polymer of higher molecular weight, or by decreasing pressure in said reservoir to prepare polymer of lower molecular weight.

11. The process of claim 2 in which the polymerization reaction vessel is cooled by evaporation of monomers therein.

References Cited
UNITED STATES PATENTS

| | | | |
|---|---|---|---|
| 3,635,919 | 1/1972 | Goffinet, Jr. | 260—94.9 P |
| 3,051,690 | 8/1962 | Vanderberg | 260—88.2 R |
| 3,637,616 | 1/1972 | Petersen | 260—80.78 |
| 3,691,142 | 9/1972 | Petersen | 260—88.2 R |

FOREIGN PATENTS

| | | | |
|---|---|---|---|
| 991,397 | 5/1965 | Great Britain | 260—94.9 P |

JOSEPH L. SCHOFER, Primary Examiner

A. HOLLER, Assistant Examiner

U.S. Cl. X.R.

260—88.2 R, 93.7, 94.9 P